United States Patent
Sarma et al.

(10) Patent No.: US 9,245,095 B2
(45) Date of Patent: Jan. 26, 2016

(54) SYSTEM AND METHOD FOR LICENSE MANAGEMENT OF VIRTUAL MACHINES AT A VIRTUAL MACHINE MANAGER

(75) Inventors: Yellapragada Venkata Subrahmanya Sarma, Hyderabad (IN); Gautham Muthyala, Hyderabad (IN); Muthu Krishnan Sattanathan, Madurai (IN); Manigandan Bakthavatchalam, Tamil Nadu (IN)

(73) Assignee: CA, Inc., New York, NY (US)

( * ) Notice: Subject to any disclaimer, the term of this patent is extended or adjusted under 35 U.S.C. 154(b) by 592 days.

(21) Appl. No.: 13/280,815

(22) Filed: Oct. 25, 2011

(65) Prior Publication Data

US 2013/0104125 A1    Apr. 25, 2013

(51) Int. Cl.
    G06F 9/46     (2006.01)
    G06F 15/173   (2006.01)
    G06F 21/10    (2013.01)
    G06F 9/455    (2006.01)

(52) U.S. Cl.
    CPC ............ *G06F 21/10* (2013.01); *G06F 9/45558* (2013.01)

(58) Field of Classification Search
    CPC ............................ G06F 21/105; G06F 9/455
    See application file for complete search history.

(56) References Cited

U.S. PATENT DOCUMENTS

| | | | |
|---|---|---|---|
| 4,924,378 A * | 5/1990 | Hershey et al. | 726/29 |
| 6,959,291 B1 * | 10/2005 | Armstrong et al. | 705/59 |
| 7,441,113 B2 | 10/2008 | Chong et al. | |
| 7,477,745 B2 * | 1/2009 | Nakamura et al. | 380/243 |
| 7,814,495 B1 | 10/2010 | Lim et al. | |
| 7,865,893 B1 | 1/2011 | Omelyanchuk et al. | |
| 7,941,470 B2 * | 5/2011 | Le et al. | 708/208 |
| 7,966,614 B2 * | 6/2011 | Chodroff et al. | 718/1 |
| 7,975,267 B2 | 7/2011 | Bennett et al. | |
| 2005/0132362 A1 | 6/2005 | Knauerhase et al. | |
| 2008/0307414 A1 | 12/2008 | Alpern et al. | |
| 2009/0019437 A1 | 1/2009 | Feng et al. | |
| 2009/0125902 A1 | 5/2009 | Ghosh et al. | |
| 2009/0182928 A1 * | 7/2009 | Becker et al. | 711/6 |
| 2009/0313620 A1 | 12/2009 | Sedukhin et al. | |
| 2009/0328056 A1 | 12/2009 | McCune et al. | |
| 2010/0017801 A1 | 1/2010 | Kundapur | |
| 2010/0122250 A1 | 5/2010 | Challener et al. | |
| 2010/0205303 A1 * | 8/2010 | Chaturvedi et al. | 709/226 |
| 2010/0262962 A1 | 10/2010 | Chaganti | |
| 2010/0332637 A1 | 12/2010 | Doi et al. | |

(Continued)

FOREIGN PATENT DOCUMENTS

WO    WO 2010/057526    5/2010

OTHER PUBLICATIONS

Eric Siebert, "Installing and Configuring VMware ESXi.".

*Primary Examiner* — Wissam Rashid
(74) *Attorney, Agent, or Firm* — Baker Botts L.L.P.

(57) ABSTRACT

According to one embodiment of the present disclosure, a method includes receiving an event notification from a virtual machine manager operable to control the execution of one or more virtual machines, the event notification corresponding to a first virtual machine and indicating an event type associated with the first virtual machine. The method also includes updating an inventory indicating a number of active instances of one or more applications based on the event notification. The method further includes determining compliance or noncompliance with one or more license policies based on the inventory, each license policy corresponding to at least one of the one or more applications.

25 Claims, 2 Drawing Sheets

(56) References Cited

U.S. PATENT DOCUMENTS

2011/0010691 A1 1/2011 Lu et al.
2011/0047624 A1 2/2011 Vedantam et al.
2011/0072431 A1 3/2011 Cable et al.
2011/0088032 A1 4/2011 Garrett et al.

* cited by examiner

SYSTEM AND METHOD FOR LICENSE MANAGEMENT OF VIRTUAL MACHINES AT A VIRTUAL MACHINE MANAGER

TECHNICAL FIELD

The present disclosure relates generally to license management, and more specifically to license management of virtual machines at a virtual machine manager.

BACKGROUND

A virtual machine clone is a copy of an existing virtual machine, which may duplicate the state of the virtual machine at the instant of a cloning operation. When the cloning operation is complete, the virtual machine clone is a separate, independent virtual machine. With virtual machine clones, one can make many copies of a virtual machine from a single installation and configuration process. Virtual machine clones may be useful, for example, when you must deploy many identical virtual machines to a group.

Virtual machine cloning may add complexity to license and asset management in enterprise computing systems, however. For example, virtual machine cloning may cause issues for license policies that take into account the amount of active and/or or powered-on virtual machines. This is especially true with virtual machines that do not have network connectivity, as license management has typically been performed over the network.

SUMMARY

According to one embodiment of the present disclosure, a method includes receiving an event notification from a virtual machine manager operable to control the execution of one or more virtual machines, the event notification corresponding to a first virtual machine and indicating an event type associated with the first virtual machine. The method also includes updating an inventory indicating a number of active instances of one or more applications based on the event notification. The method further includes determining compliance or non-compliance with one or more license policies based on the inventory, each license policy corresponding to at least one of the one or more applications Particular embodiments of the present disclosure may allow for determining, for each application, whether the number of active instances of the application is less than or equal to a licensed number of instances of the application. Certain embodiments may allow for receiving one or more files associated with the first virtual machine from the virtual machine manager, and determining one or more applications running on the first virtual machine based on the one or more files received. Further embodiments may allow for detecting the primary disk of the first virtual machine; mounting the primary disk of the first virtual machine, and parsing one or more configuration files on the primary disk to determine the one or more applications running on the first virtual machine. Some embodiments may further allow for updating the inventory indicating a number of active instances for one or more of the applications based on the one or more files received from the virtual machine manager.

Particular embodiments of the present disclosure may allow for generating an alert in response to determining non-compliance with a license policy. Certain embodiments may allow for terminating a first application associated with a first license policy in response to determining non-compliance with the first license policy. Some embodiments may allow for deleting one or more files associated with a first application in response to determining non-compliance with a first license policy and determining that the non-compliance is caused at least in part by the first application. Some embodiments may allow for shutting down the first virtual machine running a first application in response to non-compliance with a first license policy and determining that the non-compliance is caused at least in part by the first application.

Technical advantages of the present disclosure include efficient management of license policies for applications and/or assets on virtual machines. Other technical advantages include management of applications and/or assets on virtual machines that do not have network connectivity. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

Figure 1:
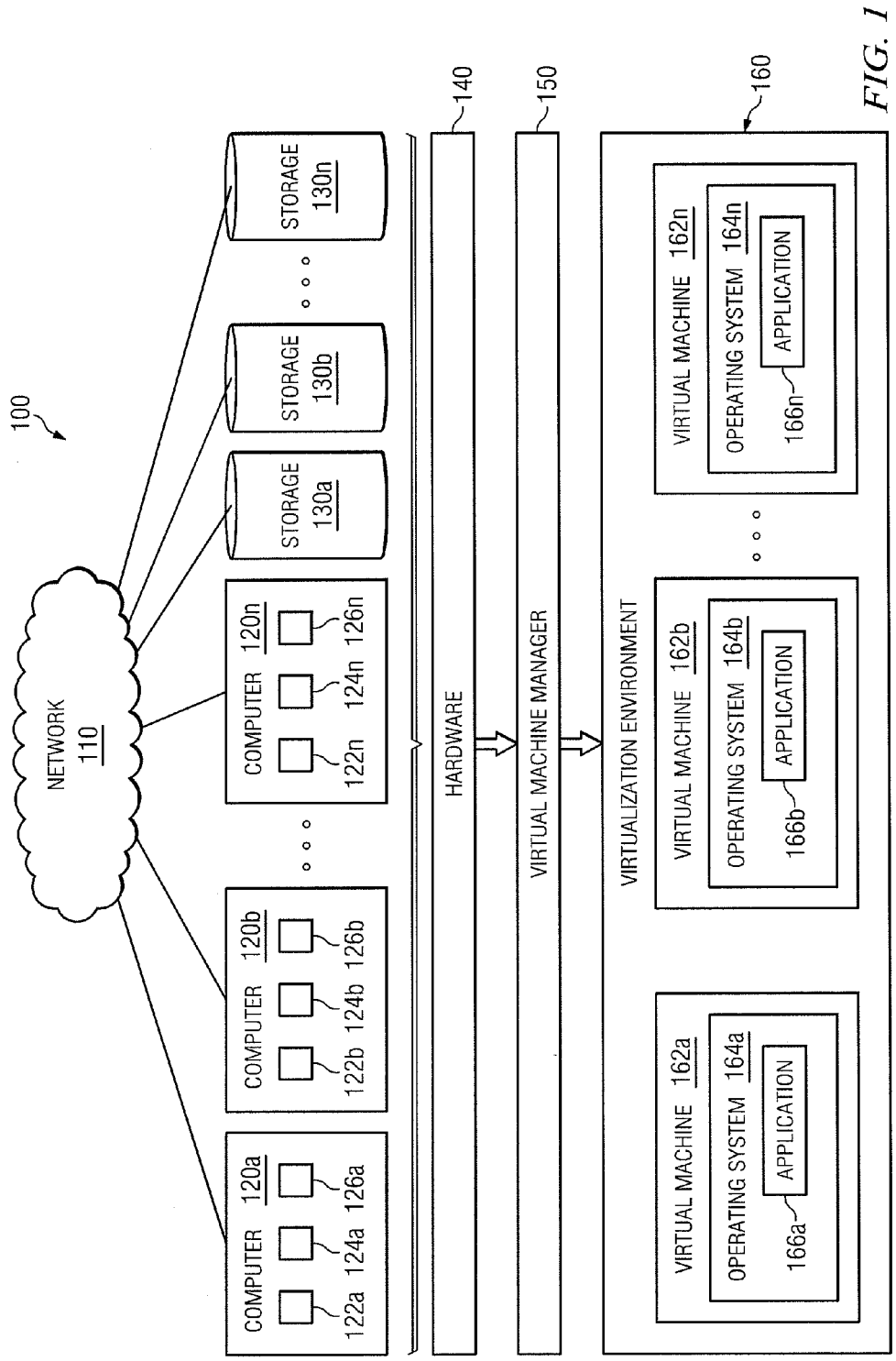
FIG. 1 illustrates a system that includes a virtual machine manager running a virtual machine environment on shared hardware.
Figure 2:
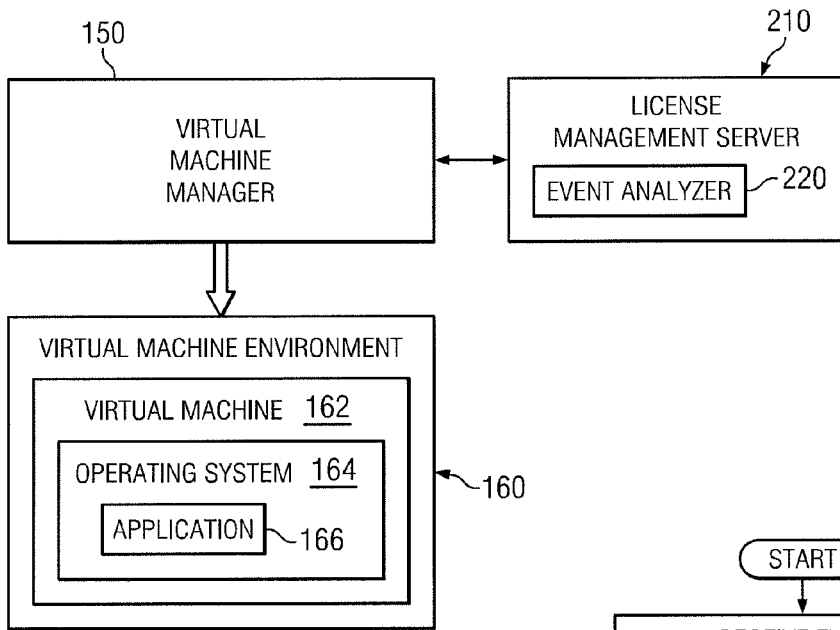
FIG. 2 illustrates a virtual machine manager communicably coupled to a license management server.
Figure 3:
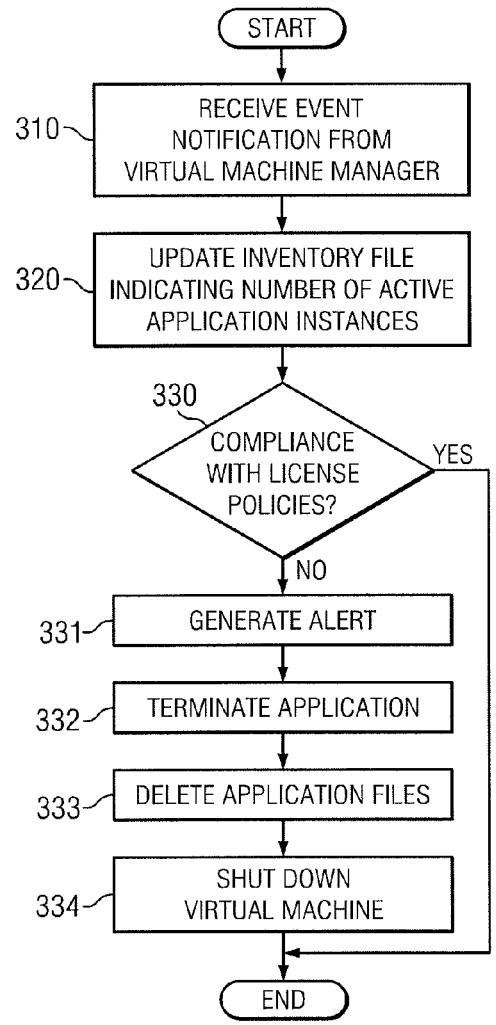
FIG. 3 illustrates an example method for license management of virtual machines.

Embodiments of the present disclosure and its advantages are best understood by referring to FIGS. 1 through 3 of the drawings, like numerals being used for like and corresponding parts of the various drawings.

FIG. 1 illustrates a system 100 that includes a virtual machine manager 150 running a virtual machine environment 160 on shared hardware 140, and may embody aspects of the present disclosure. In particular embodiments, system 100 may be used for license management of one or more virtual machines under the control or management of a virtual machine manager, regardless of whether the virtual machines have network connectivity. With virtual machine cloning becoming more ubiquitous, license management has become increasingly complex. This is especially true if the virtual machines do not have network connectivity. For instance, some license policies only account for virtual machines that are powered on, or for applications that are currently executing on virtual machines. License management can become very difficult in such a scenario, since license management has traditionally been performed over the network. Accordingly, at least one aspect of the present disclosure includes license management of virtual machines at the virtual machine manager. For example, in at least one embodiment, a license management server may be communicably coupled to a virtual machine manager. In particular embodiments, the license management server may receive an event notification from the virtual machine manager corresponding to a first virtual machine, update an inventory indicating a number of active instances of one or more applications based on the event notification, and determine compliance with one or more license policies based on the inventory.

System 100 may utilize hardware virtualization techniques to run one or more virtual machines 162 inside one or more virtual machine environments 160 that are controlled by one or more virtual machine managers 150. Hardware virtualization may refer to the abstraction of computer hardware resources, allowing for the sharing of the underlying resources between the one or more virtual machines 162. Virtual machine manager may refer to virtualization software operable to manage and/or control the execution of one or more virtual machines. In some embodiments, virtual machine manager may refer to a bare-metal or native-type hypervisor running directly on shared hardware 140 to control the hardware 140 and manage the virtual machines 162. In other embodiments, virtual machine manager may refer to a hosted-type hypervisor running within a conventional operating system environment. Examples of virtual machine manager software include VMWARE VSPHERE, VMWARE ESXI, CITRIX XENSERVER, and MICROSOFT HYPER-V. In certain embodiments, virtual machine manager 150 may run on a plurality of computer systems 130 in shared hardware 140. In other embodiments, virtual machine manager 150 may run on a single computer system 130 in shared hardware 140.

Virtual machine manager 150 may be operable to create and control virtual machine environment 160. Virtual machine environment 160 may be operable to run one or more virtual machines 152. A virtual machine may refer to the software implementation of a physical machine, wherein the virtual machine may provide computer functionality. Thus, a virtual machine may provide an environment that emulates a physical computer platform, and may execute an operating system and/or one or more software programs or modules. For example, virtual machines 152 may run operating systems such as MICROSOFT WINDOWS, LINUX, and MAC OS. Furthermore, virtual machines 152 may run one or more software applications 156 and/or other logic that may be encoded in one or more tangible computer-readable media and may perform operations when executed by processor 122.

Network 110 may refer to any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise internet, or any other suitable communication link, including combinations thereof. Network 110 may connect a plurality of computer systems 120.

Computer system 120 includes a processor 122, memory 124, and an interface 126. Processor 122 may refer to any suitable device operable to execute instructions and manipulate data to perform operations for computer system 120. Processor 122 may include, for example, any type of central processing unit (CPU).

Memory 124 stores information and may comprise one or more tangible, computer-readable, and/or computer-executable computer readable medium, and may exclude signals or carrier waves. Examples of memory include computer memory (for example, Random Access Memory (RAM) or Read Only Memory (ROM)), mass computer readable media (for example, a hard disk), removable computer readable media (for example, a Compact Disk (CD) or a Digital Video Disk (DVD)), and/or other computer-readable medium.

Interface 126 may refer to any suitable device operable to receive input for computer system 120, send output from computer system 120, perform suitable processing of the input or output or both, communicate to other devices, or any combination of the preceding. Interface 126 may include appropriate hardware (e.g. modem, network interface card, etc.) and software, including protocol conversion and data processing capabilities, to communicate through a LAN, WAN, or other communication system that allows computer system 120 to communicate to other devices. Interface 126 may include one or more ports, conversion software, or both.

Storage 130 may provide additional data storage capacity and may include database and/or network storage (for example, a server), or any other suitable tangible, computer-readable storage media. In certain embodiments, storage 130 may include network resources, such as one or more storage area networks (SAN) or network-attached storage (NAS).

FIG. 2 illustrates a virtual machine manager 150 communicably coupled to a license management server 210. In particular embodiments, license management server 210 may be any physical or virtual machine that has connectivity to virtual machine manager 150. In certain embodiments, license management server 210 may perform event registration on virtual machine manager 150. In some embodiments, license management server may comprise an event analyzer module 220 operable to detect events on virtual machine manager 150, such as the power-on or power-off of a virtual machine 162 under the control of virtual machine manager 150. In particular embodiments, license management server 210 may maintain an inventory of applications and/or assets running on virtual machines 162 and the number of active or inactive instances thereof.

In some embodiments, the number of active instances of an application may refer to those instances of the application that are installed on virtual machines 162. In other embodiments, the number of active instances of an application may refer to those instances of the application that are currently being implemented or executed on virtual machines 162. This may be advantageous, for example, with certain license policies such as "floating user" policies. In some embodiments, such an inventory may be categorized by the power-on state of each virtual machine 162. For example, the inventory may indicate how many application instances installed on virtual machines 162 that are in the powered-on state, and how many application instances are installed on virtual machines 162 that are in the powered-off state.

In some embodiments, license management server 210 may maintain the inventory of application instances by receiving one or more files associated with virtual machine 162 from the virtual machine manager 150, and then determining the one or more applications 166 installed on virtual machine 162 based on the one or more files received. The one or more files may be any suitable file or group of files that may allow license management server 210 to determine the one or more applications 166 running on virtual machine 162. In certain embodiments, the one or more files may be a snapshot of virtual machine 162. A snapshot may refer to a copy of all files and/or data on virtual machine 162 at a particular point in time. In further embodiments, the snapshot may be taken by virtual machine manager 150. For example, license management server 210 may receive the snapshot from virtual machine manager 150 through virtual machine management software such as VMWARE VSPHERE WEB SERVICES SDK.

After receiving the snapshot, license management server 210 may then detect and mount the primary disk (e.g. windows boot partition) on virtual machine 162. Mounting may refer to the process of making a disk or other suitable storage device available for use by a computer system. In some embodiments, this may include instructing the computer to incorporate the storage device's file system into the computer's file system. Detecting and mounting the primary disk may be accomplished, for example, using software such as VMWARE VSTORAGE. In further embodiments, license management server 210 may then load the configuration files of virtual machine 162 and parse the configuration files to determine the applications running on virtual machine 162. Configuration files may include, for example, system registry keys and/or registry hives, and may include system settings and/or options. In some embodiments, the configuration files may be operable to store configuration settings and/or options for the operating system on virtual machine 162. In some embodiments, the configuration files may include settings for low-level operating system components and/or the applications running on virtual machine 162. Based on the information and/or data contained in the configuration files, license management server 210 may determine a number of applications installed and/or running on virtual machine 162. In some embodiments, license management server 210 may then use this information to update and/or maintain the inventory of active application instances.

In particular embodiments, event analyzer module 220 on license management server 210 may receive an event notification from virtual machine manager 150. In some embodiments, the event notification may indicate an event type specifying whether a virtual machine 162 has, for example, been powered-on, powered-off, created, removed from inventory, or migrated to virtual machine environment 160. In some embodiments, the event notification may specify whether an application 166 has been opened and/or started executing on virtual machine 162. In some embodiments, the event notification may specify whether an application 166 has been installed or uninstalled on a virtual machine 162.

Event notification for application opening and/or starting may be accomplished, for example, by injecting an executable file onto the virtual machine 162 using virtual machine management software such as VMWARE VSPHERE WEB SERVICES SDK. The injected executable file may run on virtual machine 162 and monitor the opening and/or starting of one or more applications on virtual machine 162. The injected executable file running on virtual machine 162 may store information associated with the opening and/or starting of one or more applications to a specific local file on virtual machine 162. License management server 210 may then periodically retrieve the local file using the virtual machine management software (e.g. VMWARE VSPHERE WEB SERVICES SDK) in order to check the state of the one or more applications.

In certain embodiments, event analyzer module 220 may categorize the event type based on the event notification. For example, if virtual machine 162 is powered-on, the event type may be determined to be a power-on event. Similarly, if an application 166 has begun executing on virtual machine 162, the event type may be determined to be a begin-execution event. In some embodiments, the event notification may identify the virtual machine 162. For example, the event notification may include an IP address, MAC address, and/or hostname associated with the virtual machine 162.

In particular embodiments, event analyzer module 220 may retrieve one or more license policies based on the event notification. In some embodiments, each license policy may correspond to one of one or more applications running on virtual machine 162. For example, an event notification may indicate that a particular virtual machine has been powered-on. Based on such an event notification, event analyzer module 220 may retrieve one or more license policies for every application installed on the virtual machine.

In particular embodiments, event analyzer module 220 may be operable to determine compliance with the one or more license policies. In some embodiments, determining compliance with the one or more license policies may include determining, for each application, whether a number of active instances of the application is less than or equal to a licensed number of instances of the application. For example, a license policy for a particular application may indicate that only 20 running instances of the application are allowed at any given time. If a virtual machine is powered-on and comprises the 21st instance of the application, event analyzer module 220 may determine that system 100 is not in compliance with the license policy.

In further embodiments, event analyzer module 220 may be operable to trigger an action based on the determination of compliance. Such actions may include generating an alert indicating non-compliance with the license policy, shutting down virtual machines comprising non-compliant applications, terminating one or more non-compliant applications, uninstalling non-compliant applications from the virtual machines, disabling non-compliant applications on virtual machines, refusing to execute non-compliant applications, or denying the cloning of virtual machines where the clone would be non-compliant with one or more license policies. Event analyzer module 220 may also be operable to notify a user before performing any of such actions. As one example, event analyzer module 220 may cause an email to be sent to a system administrator in response to non-compliance with a license policy. In some instances, using the example given above, event analyzer module 220 may cause the virtual machine comprising the 21st instance to shut down in response to the determination of non-compliance. In some embodiments, license management server 210 may be operable to terminate the non-compliant application. For instance, using the above example, license management server 210 may terminate the application on virtual machine 162 that comprises the 21st active instance of such application. In particular embodiments, license management server 210 may be operable to install or uninstall an application on a virtual machine 162 based on a license policy. For example, if the active number of application instances exceeds the licensed amount of instances, the license management server may be operable to uninstall a proper amount of instances such that system 100 is compliant with the license policy. In such embodiments, license management server 210 may copy an installer package onto virtual machine 162 that may run a set of instructions to uninstall a non-compliant application. This may be accomplished, for example, using virtual machine management software such as VMWARE VSPHERE WEB SERVICES SDK.

FIG. 3 illustrates an example method for license management of virtual machines. At step 310, license management server 210 receives an event notification from virtual machine manager 150. In certain embodiments, the event notification may correspond to a virtual machine 162 running under the control of virtual machine manager 150. For example, license management server 210 may receive a notification from virtual machine manager 150 indicating that a particular virtual machine 162 has powered-on. In certain embodiments, the event notification may indicate an event type associated with the virtual machine. For example, if virtual machine 162 is powered-on, the event type may be determined to be a power-on event. Other event types may include a power-off event, a clone event, and/or a migration event indicating, respectively, a virtual machine being powered-off, a virtual machine 162 being cloned in virtual machine environment 160, and a virtual machine 162 being migrated to the virtual machine environment 160 from another virtual machine environment. In addition, other event types may also include application begin-execution and end-execution events, indicating, respectively, when an application 166 has begun execution on a virtual machine 162 and when an application 166 has ended execution on a virtual machine 162.

At step 320, license management server 210 updates an inventory indicating a number of active instances of one or more applications. In some embodiments, updating the inventory may be based on the event notification received from virtual machine manager 150. In particular embodiments, license management server 210 may maintain the inventory by receiving one or more files on virtual machine 162 from virtual machine manager 150. In certain embodiments, license management server 210 may receive the one or more files from a snapshot of virtual machine 162. After receiving the one or more files, license management server 210 may then determine the one or more applications running on virtual machine 162 based on the one or more files received. In some embodiments, determining the one or more applications running on virtual machine 162 may include detecting the primary disk of virtual machine 162, mounting the primary disk of virtual machine 162, and parsing one or more configuration files on the primary disk to determine the one or more applications running on virtual machine 162. In certain embodiments, updating the inventory indicating a number of active instances for one or more of the applications may be additionally based on the one or more files received from the virtual machine manager.

At step 330, license management server 210 determines compliance or non-compliance with at least one or more license policies based on the inventory of active instances of one or more applications. In some embodiments, each license policy may correspond to one of the one or more applications running on virtual machine 162. In particular embodiments, determining compliance with the one or more license policies may comprise determining, for each application, whether a number of active instances of the application is less than or equal to a licensed number of instances of the application. If license management server 210 determines that system 100 is in compliance with the one or more license policies, then the method comes to an end.

However, if license management server 210 determines that system 100 is not in compliance with any of the one or more license policies, the method proceeds to steps 331-334. At step 331, license management server 210 generates an alert in response to determining non-compliance with a license policy. At step 332, license management server 210 terminates the application on the first virtual machine in non-compliance with a license policy. At step 333, license management server 210 deletes one or more files on virtual machine 162 associated with the one or more applications in non-compliance. At step 334, license management server 210 shuts down virtual machine 162 in response to an installed application not complying with a license policy. Although FIG. 3 depicts each of steps 331-334 being performed in the method, any number or combination of steps 331-334 may be performed in response to non-compliance with a license policy. Furthermore, license management server 210 may be operable to perform any of the following actions in addition to or in lieu of steps 331-334: disable non-compliant applications on virtual machines, refuse to execute non-compliant applications, or deny the cloning of virtual machines where the clone would be non-compliant with one or more license policies Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed:

1. A method for license management of virtual machines, comprising:
   receiving an event notification from a virtual machine manager configured to control the execution of a plurality of virtual machines, the event notification corresponding to a first virtual machine and indicating an event type associated with the first virtual machine;
   receiving a file from the virtual machine manager, the file being a snapshot of the first virtual machine;
   parsing a configuration file of the first virtual machine to determine a number of: a first plurality of applications installed on the first virtual machine and a second plurality of applications running on the first virtual machine;
   updating, with the determined number, an inventory indicating how many active instances of the first plurality of applications and the second plurality of applications are in the plurality of virtual machines based on the event notification; and
   determining compliance or non-compliance with a plurality of license policies based on the inventory, each license policy of the plurality of license policies corresponding to at least one application of: the first plurality of application and the second plurality of applications in the first virtual machine.

2. The method of claim 1, wherein determining compliance with the plurality of license policies comprises determining, for each application, whether the number of active instances of the application is less than or equal to a licensed number of instances of the application.

3. The method of claim 1, wherein the event type is a power-on event, the method further comprising:
   wherein an active instance of an application comprises at least one of an instance of an application that is installed on a virtual machine and an instance of an application that is running on a virtual machine.

4. The method of claim 3, wherein determining the second plurality of applications running on the first virtual machine comprises:
   detecting a primary disk of the first virtual machine; and
   mounting the primary disk of the first virtual machine.

5. The method of claim 3, wherein updating an inventory indicating a number of active instances of the first plurality of applications is further based on the file received from the virtual machine manager.

6. The method of claim 1, further comprising generating an alert in response to determining non-compliance with a license policy.

7. The method of claim 1, further comprising terminating a first application associated with the first license policy in response to determining non-compliance with the first license policy.

8. The method of claim 1, further comprising deleting a file associated with a first application in response to determining non-compliance with a first license policy and determining that the non-compliance is caused at least in part by the first application.

9. The method of claim 1, further comprising shutting down the first virtual machine running a first application in response to determining non-compliance with a first license policy and determining that the non-compliance is caused at least in part by the first application.

10. The method of claim 1, further comprising:
receiving an additional event notification from the virtual machine manager, the additional event notification comprising a clone event, the clone event corresponding to a second virtual machine being cloned;
determining whether an active instance of a second application on the second virtual machine would be non-compliant with a second license policy; and
in response to determining that the active instance of the second application on the second virtual machine would be non-compliant, preventing the second virtual machine from being cloned.

11. A system for license management of virtual machines, comprising at least one processor configured to:
receive an event notification from a virtual machine manager configured to control the execution of a plurality of virtual machines, the event notification corresponding to a first virtual machine and indicating an event type associated with the first virtual machine;
receive a file from the virtual machine manager, the file being a snapshot of the first virtual machine;
parse a configuration file of the first virtual machine to determine a number of: a first plurality of applications installed on the first virtual machine and a second plurality of applications running on the first virtual machine;
update, with the determined number, an inventory indicating how many active instances of the first plurality of applications and the second plurality of applications are in the plurality of virtual machines, based on the event notification; and
determine compliance or non-compliance with a plurality of license policies based on the inventory, each license policy of the plurality of license policies corresponding to at least one application of: the first plurality of applications and the second plurality of applications in the first virtual machine.

12. The system of claim 11, wherein the at least one processors configured to determine compliance or non-compliance with the plurality of license policies are further configured to determine, for each application, whether the number of active instances of the application is less than or equal to a licensed number of instances of the application.

13. The system of claim 11, wherein an active instance of an application comprises at least one of an instance of an application that is installed on a virtual machine and an instance of an application that is running on a virtual machine.

14. The system of claim 13, wherein the at least one processors configured to determine the one or more applications running on the first virtual machine are further configured to:
detect a primary disk of the first virtual machine; and
mount the primary disk of the first virtual machine.

15. The system of claim 11, wherein the at least one processors are further configured to generate an alert in response to determining non-compliance with a license policy.

16. The system of claim 11, wherein the at least one processors are further configured to terminate a first application associated with the first license policy in response to determining non-compliance with the first license policy.

17. The system of claim 11, wherein the at least one processors are further configured to delete a file associated with a first application in response to determining non-compliance with a first license policy and determining that the non-compliance is caused at least in part by the first application.

18. The system of claim 11, wherein the at least one processors are further configured to shut down the first virtual machine running a first application in response to determining non-compliance with a first license policy and determining that the non-compliance is caused at least in part by the first application.

19. Logic encoded in non-transitory computer readable medium, the logic comprising instructions that, when executed by a processor, cause the processor to:
receive an event notification from a virtual machine manager configured to control the execution of a plurality of virtual machines, the event notification corresponding to a first virtual machine and indicating an event type associated with the first virtual machine;
receive a file from the virtual machine manager, the file being a snapshot of the first virtual machine;
parse a configuration file of the first virtual machine to determine a number of: a first plurality of applications installed on the first virtual machine and a second plurality of applications running on the first virtual machine;
update, with the determined number, an inventory indicating how many active instances of the first plurality of applications and the second plurality of applications are in the plurality of virtual machines, based on the event notification; and
determine compliance or non-compliance with a plurality of license policies based on the inventory, each license policy of the plurality of license policies corresponding to at least one application of: the first plurality of applications and the second plurality of applications in the first virtual machine.

20. The logic of claim 19, wherein the instructions that cause the processor to determine compliance or non-compliance with the plurality of license policies further cause the processor to determine, for each application, whether the number of active instances of the application is less than or equal to a licensed number of instances of the application.

21. The logic of claim 19, wherein an active instance of an application comprises at least one of an instance of an application that is installed on a virtual machine and an instance of an application that is running on a virtual machine.

22. The logic of claim 21, wherein the instructions that cause the processor to determine the one or more applications running on the first virtual machine further cause the processor to:
detect a primary disk of the first virtual machine; and
mount the primary disk of the first virtual machine.

23. The logic of claim 19, wherein the one or more processors further cause the processor to generate an alert in response to determining non-compliance with a license policy.

24. The logic of claim 19, wherein the instructions further cause the processor to terminate a first application associated with the first license policy in response to determining non-compliance with the first license policy.

25. The logic of claim 19, wherein the instructions further cause the processor to delete one or more files associated with a first application in response to determining non-compliance with a first license policy and determining that the non-compliance is caused at least in part by the first application.

* * * * *